Nov. 30, 1948.  W. P. CARR  2,454,910
METHOD OF APPLYING COATINGS
TO MOLDED OR CAST ARTICLES
Filed April 4, 1946

INVENTOR
W. P. Carr
BY

ATTORNEY

Patented Nov. 30, 1948

2,454,910

UNITED STATES PATENT OFFICE 2,454,910

METHOD OF APPLYING COATINGS TO MOLDED OR CAST ARTICLES

William P. Carr, Rossford, Ohio, assignor to The De Vilbiss Company, Toledo, Ohio, a corporation of Ohio Application April 4, 1946, Serial No. 659,658

5 Claims. (Cl. 18—59)

This invention relates to a method of applying coatings to molded or cast articles.

A principal object of this invention is the provision of a method of placing a coating for decorative or utilitarian purposes upon articles composed of plastic materials.

This and other objects of the invention are attained through the deposit of the desired coating upon the inner surface of the mold prior to the introduction of the regular molding or casting material therein.

The coating may extend over the complete surface, be restricted by guards or stencils to certain areas, or be in lines, spots or shades as produced by veiling and spatter spray nozzles or by stipple brushes, sponges and other special tools.

Figure 1:
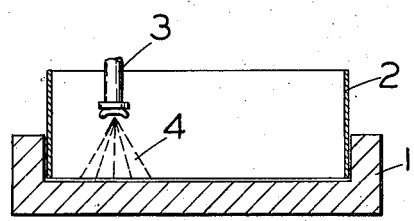
Figure 2:
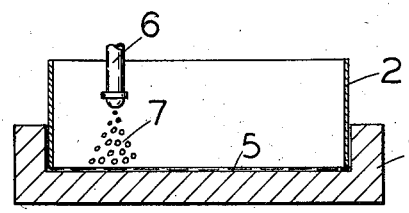
Figure 3:
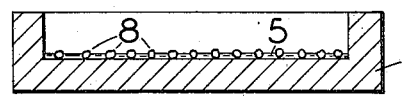
Figure 4:
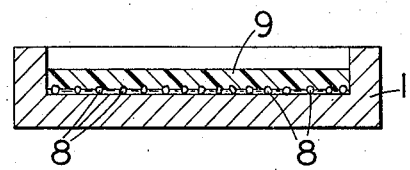

One method involving my invention is figuratively illustrated in the accompanying drawing in which Figure 1 is a vertical section of a mold 1 with a shield 2 covering the sides of the mold and a spray nozzle 3 applying a non-permanent coating material 4 to the exposed surface of the mold;

Figure 2 is a similar view in which a spray nozzle 6 is projecting inert particles 7 into the previously applied coating 5;

Figure 3 shows the section of the mold 1 with the shield 2 removed and the inert particles 8 partially embedded in the non-permanent coating; and Figure 4 shows the mold 1 with the plastic 9 of which the molded article is formed, deposited in the mold over the ends of the inert particles 8 extending above the surface of the non-permanent coating 5.

The coating material should be one to which the molding material will readily adhere and preferably one of a similar nature with which the molding material will fuse and become integral during the setting or curing action of the molding operation.

The coating may be composed of several components applied successively over each other. Different colors may in this way be blended or otherwise combined.

While, for instance, less care might be required by utilizing a coating material derived from a phenol formaldehyde base plastic for use upon an article molded with such a material, in order to obtain a certain color or characteristic a coating material composed of a urea plastic might be preferred.

Inasmuch as both of these plastics are fusible in nature before being cured by heat such a combination of a coating and a body material would be suitable for molding together.

Metal particles such as aluminum flakes may be incorporated in a clear plastic resin liquid such as Bakelite resin XM-9131 dissolved in alcohol and be deposited upon the mold cavity surface. It will become integral with the body of the molded plastic article if the latter is made of the same material. Such metal coated objects are useful in radios due to the shielding effect of the metal layer.

A plastic base coating liquid may be of several types. For example, a solution of the uncured resin with a rapidly drying solvent would ordinarily be practical. The liquid coating could also be a suspension of powdered resin or a plastic rendered molten by heat. Spray nozzles and delivery equipment would have to be arranged with heating elements to handle the last material.

Extension nozzles such as used for coating the inside of shells are adaptable for coating mold cavities. These may be automatic in operation and mounted for movement into and out of the mold during each cycle of operation. Nozzles could be incorporated in the walls of the mold somewhat as are the fuel nozzles fixed within the combustion chambers of Diesel engines. If so stationarily located the nozzles would ordinarily be flush with the mold walls and have shut-off valves for both the liquid and the air reaching to the ends of the outlet passages. These valves would be operated in synchronism with the molding operation.

One of the most beneficial characteristics of a finish created by this invention is that the coating material is embedded in the body of the article decorated, providing a smooth contour with no raised portions. A particularly attractive and rich inlay appearance may thus be obtained through the use of gold or bright colored marbleizing lines or speckles upon a light background.

With this invention even a flock finish may be obtained. To attach such a covering to a molded article a non-permanent adhesive substance is first applied to the surface of the cavity. This may be water soluble so that it may be washed off later. To this the flock is applied. The molding material will fuse around the projecting ends of the flock fibres and the latter thus become attached to the surface of the finished molded article.

Abrasives, crushed shells, metals, or other hard particles may similarly be held in place for embedding in the plastic substance by the molding operation. In either of these cases better adhesion may be obtained if a liquid plastic is applied to the flock or hard particles before the introduction of the molding material.

The various coatings thus applied to plastic articles not only provide decorative or protective surfaces but also may have other beneficial results. For instance the flow lines that have to be guarded against in certain shapes of molded articles would be separated from the surface by the thickness of the imposed coating. A coating may be desirable for this purpose alone.

In practicing my invention a phenolic plastic might be selected as the molding material for a radio cabinet because of its low cost and its well known working qualities. In order to obtain a light colored finish a urea plastic coating liquid could be utilized. Also it may be desired to have a spattering of gold dots upon the light colored background.

To obtain such a product gold bronze in a clear fusible resin base would first be lightly spattered upon the walls of the mold cavity. In a large compression type mold the plunger or force might be raised sufficiently for a standard hand spray gun to be used for this purpose. After allowing the momentary time to elapse for the bronze liquid to dry, a solid cover of the light colored liquid urea plastic is sprayed upon the entire surface of the mold cavity.

After this has properly air set, the phenolic molding powder, either loose or in pill form, is put in the mold. The plunger is then brought down and the curing heat applied. After the proper curing time has elapsed the mold is opened and the molded radio cabinet removed. While the inner walls of the finished article is the dark color of the phenolic plastic the outer surface will be composed of the light colored urea material with the integral specks of gold embedded therein, the whole piece comprising a solid thermoset unit.

The outstanding uniqueness of this process lies in the creation of the finish coating before the existence of the article upon which it is to be lodged.

Another feature is that the coating assumes a reverse position upon the object from that on the mold. The surface upon which it is laid controls to a large degree its later outer smoothness, while its original outer surface becomes that by which it is attached to the coated article. Care need not be taken therefor to make this latter surface as smooth as is required in ordinary coating operations in which it is the final exterior surface.

The possibilities of this process extend to practically all of the various conventional coating methods although in many cases the steps involved have to be reversed or otherwise altered. Its use broadens tremendously the field of finishes possible with plastic or other molded or cast articles which, because of the nature of their composition and creation, present such a non-cooperative surface to coating substances after they are formed.

While powdered molding material is referred to herein this invention is, of course, likewise adaptable to methods involving the casting of articles from liquid materials. In this category would be included various waxes, ceramics, and metals. The coating ingredients would have to be properly selected for such materials. Powdered ceramics carried in a volatile vehicle would be suitable for objects cast of glass. Metals would be adaptable for metallic castings.

While a compression mold is mentioned herein other types are also suitable. Where the walls of the mold are in fixed position, a coating for the complete article is somewhat simplified as no large area on a plunger fits against the surface of the object and needs to be coated.

In view of the basic nature of the invention and the wide scope of its utility, any details presented herein should in no way be considered to limit the broad aspects of the appended claims.

What I claim is:

1. A method of applying a coating to a molded article which comprises first providing a mold in which the article is to be formed, then coating the mold surface with an adhesive substance of nonpermanent nature, partially imbedding inert particles in the adhesive substance, applying a coating of material to be a permanent part of the molded article over the imbedded inert particles, filling the balance of the mold with molding material, permitting the molding material to harden, withdrawing the formed article from the mold, and finally removing any nonpermanent adhesive substance from the surface of the article leaving the inert particles fixed in the article with their outer ends protruding to the extent they were embedded in the adhesive substance.

2. A method of applying a coating to a molded article which comprises first providing a mold in which the article is to be formed, then coating the mold surface with an adhesive substance of nonpermanent nature, partially imbedding inert particles in the adhesive substance, filling the mold with material of which the article is to be formed, permitting the molding material to harden sufficiently to grasp the free ends of the inert particles, withdrawing the formed article from the mold, and finally removing any nonpermanent adhesive substance from the surface of the article leaving the inert particles fixed in the article with outer ends protruding to the extent they were embedded in the adhesive substance.

3. A method as set forth in claim 2 in which the adhesive material is water soluble and removed after the molding operation by flushing with water.

4. A method as set forth in claim 2 in which the inert particles are abrasive.

5. A method as set forth in claim 2 in which the inert particles are flock.

WILLIAM P. CARR.

REFERENCES CITED

The following references are of record in the file of this patent:

UNITED STATES PATENTS

| Number | Name | Date |
|---|---|---|
| 939,966 | Baekeland | Nov. 16, 1909 |
| 1,094,828 | Aylworth | Apr. 28, 1914 |
| 1,515,150 | Copeman | Nov. 11, 1924 |
| 1,518,254 | Copeman | Dec. 9, 1924 |
| 2,220,140 | Bartling et al. | Nov. 5, 1940 |
| 2,250,958 | Kautter et al. | July 29, 1941 |
| 2,313,985 | Bradshaw | Mar. 16, 1943 |

FOREIGN PATENTS

| Number | Country | Date |
|---|---|---|
| 505,579 | Great Britain | May 12, 1939 |